United States Patent
Wada

[19]

[11] Patent Number: 6,055,026
[45] Date of Patent: Apr. 25, 2000

[54] APPARATUS FOR HOLDING DEGAUSS COIL

[75] Inventor: Shuichi Wada, Saitama, Japan

[73] Assignee: Sony Corporation, Tokyo, Japan

[21] Appl. No.: 08/805,922

[22] Filed: Feb. 25, 1997

[30] Foreign Application Priority Data

Feb. 29, 1996 [JP] Japan ................................. 8-042707

[51] Int. Cl.[7] .............................. H04N 5/65; H04N 5/655
[52] U.S. Cl. ......................... 348/820; 348/828; 361/150
[58] Field of Search ........................... 269/908; 313/378, 313/364; 315/8; 361/150; 348/818–831, 776

[56] References Cited

U.S. PATENT DOCUMENTS

Re. 36,429  12/1999  Yamaguchi .............................. 348/820
3,876,899   4/1975  Davis et al. ............................. 313/482
5,216,326   6/1993  Lundgren .................................... 315/8
5,416,595   5/1995  Wield ..................................... 348/825

*Primary Examiner*—Vu Le
*Attorney, Agent, or Firm*—Jay H. Maioli

[57] ABSTRACT

An apparatus for attaching a degauss coil to a cathode-ray tube can simplify a manufacturing process by reducing the number of assemblies for attaching a degauss coil stretched over a curved surface of a funnel of a cathode-ray tube. This apparatus includes a front cabinet for holding a cathode-ray tube with a screen on which an image is displayed by the scanning of electron beams and a degauss coil disposed at the rear of the cathode-ray tube for degaussing the cathode-ray tube wherein degauss coil holders for holding the degauss coil are unitarily formed as one body with the front cabinet.

3 Claims, 6 Drawing Sheets

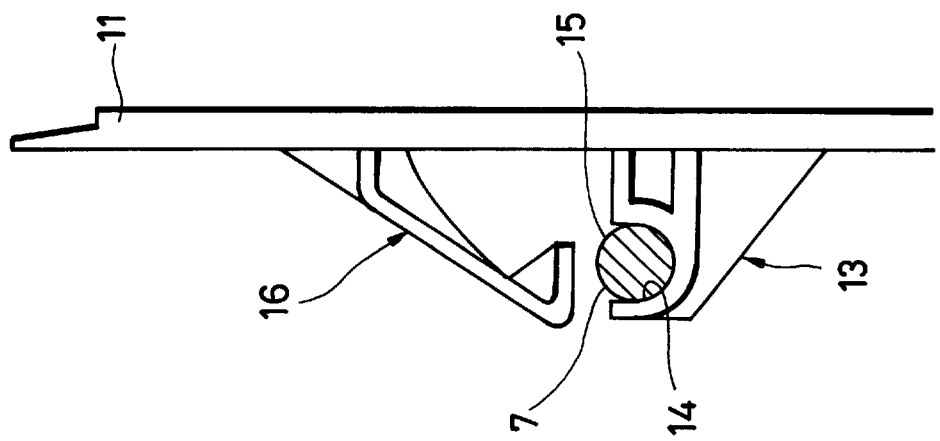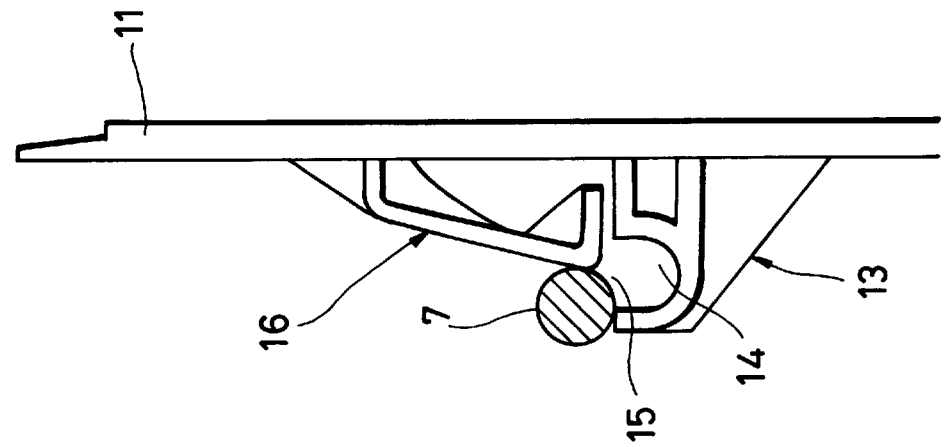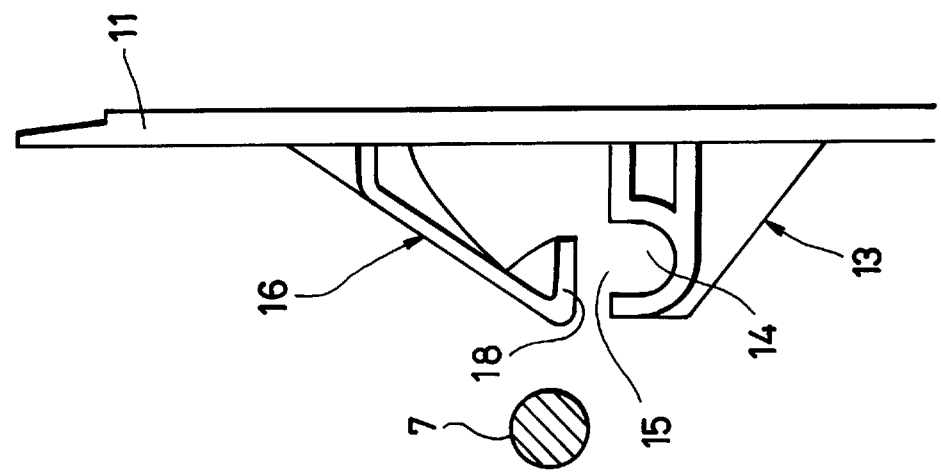

APPARATUS FOR HOLDING DEGAUSS COIL

BACKGROUND OF THE INVENTION

Title of the Invention

The present invention relates to a receiver such as a television receiver or a monitor using a cathode-ray tube, and particularly to an apparatus for attaching a degauss coil used to degauss a cathode-ray tube, i.e. an apparatus for attaching a degauss coil stretched over a curved surface of a funnel formed at the rear of the cathode-ray tube.

Description of the Related Art

Heretofore, receivers such as a television receiver using a cathode-ray tube include a degauss coil tightly attached to a curved surface of a funnel of a cathode-ray tube having a screen on which a picture is displayed by the scanning of electron beams. When the television receiver is energized to receive and reproduce a picture on a screen, the degauss coil degausses the cathode-ray tube and portions surrounding the cathode-ray tube so that a displayed picture can be undisturbed by magnetization of cathode-ray tube assemblies.

FIG. 1 of the accompanying drawings shows an example of an apparatus for holding a degauss coil to a cathode-ray tube. As shown in FIG. 1, a degauss coil holding apparatus 1 comprises a supporting seal portion 3 of a flat belt-like configuration made of a metal material attached to the outer periphery of a screen of substantially rectangular configuration of a cathode-ray tube 2, slot portions 4 formed on the upper and lower locations of the side surfaces of the supporting seal portion 3 and degauss coil holders 5 made of resin and fitted into the slot portions 4.

FIG. 2 shows more clearly the supporting seal portion 3, the slot portion 4 and the degauss coil holder 5. As shown in FIG. 2, the degauss coil holder 5 has a long and thin configuration curved along a curved surface of a funnel of a cathode-ray tube. The degauss coil holder 5 includes an engagement portion 6 formed at its tip end portion and a fitting portion 8 formed at its substantially intermediate position. The engagement portion 6 is engaged with the slot portion 4, and a degauss coil 7 is fitted into the fitting portion 8.

The fitting portion 8 has a coil housing portion 9 with a space in which the degauss coil 7 is engaged and a hook 10 formed on the engaged side as a retaining resilient member.

As shown in FIGS. 1 and 2, the degauss coil holder 5 is attached to the supporting portion 3 such that the supporting portion 3, which is the metal seal member, is attached to the screen side of the cathode-ray tube 2, i.e. the peripheral portion where the funnel 2a of the cone portion and the panel are joined and the engagement portions 6 are fitted into the slot portions 4 provided on the supporting portion 3.

To engage the degauss coil 7 with the degauss coil holder 5 thus attached to the supporting portion 3, after the hook 10 is opened in the outer direction or the hook 10 is pressed from the outside, the degauss coil 7 is inserted into and housed in the coil housing portion 9, whereafter the degauss coil 7 is secured to the funnel 2a by the hook 10.

The degauss coil holder 5 is provided at upper and lower locations on the left and right side surfaces of the supporting portion 3, i.e. four places in total, and the degauss coil 7 is stretched over the periphery of the rear of the cathode-ray tube 2. When the degauss coil 7 is tightly attached to the funnel 2a of the cathode-ray tube 2 as described above, the cathode-ray tube 2 and the portions surrounding the cathode-ray tube 2 can be degaussed. Accordingly, it is possible to prevent a misregistration from being caused when an aperture grille, for example, is magnetized.

However, in the above-mentioned apparatus for holding a degauss coil to a cathode-ray tube, since the degauss coil holder is composed of other assemblies and fixed to the supporting portion, the number of cathode-ray tube assemblies increases there by making the cathode-ray tube expensive. In addition, a working process for attaching a degauss coil to a cathode-ray tube is lowered in efficiency.

Therefore, the above-mentioned apparatus is in need of an arrangement where a degauss coil can be easily and tightly attached to predetermined positions on the curved surface of a funnel of a cathode-ray tube.

SUMMARY OF THE INVENTION

In view of the aforesaid aspect, it is an object of the present invention to provide an apparatus for attaching a degauss coil to a cathode-ray tube in which a manufacturing process can be simplified by reducing the number of assemblies for attaching a degauss coil stretched over a curved surface of a funnel of a cathode-ray tube.

According to the present invention, there is provided an apparatus for attaching a degauss coil to a cathode-ray tube which is comprised of a cathode-ray tube having a screen on which an image is displayed by the scanning of electron beams, a front cabinet for holding the cathode-ray tube, and an annular degauss coil disposed on a funnel surface of the cathode-ray tube for degaussing the cathode-ray tube.

The apparatus includes a degauss coil holding portion for holding the degauss coil which is integrally formed as one body with the front cabinet.

According to the above-mentioned arrangement, the degauss coil holder for holding the degauss coil need not be prepared like other assemblies. As a result the number of assemblies can be reduced and a work process for tightly attaching the degauss coil on the curved surface of the funnel of the cathode-ray tube can be simplified.

BRIEF DESCRIPTION OF THE DRAWINGS

FIGS. 6A to 6C are schematic side views illustrating the manner in which a degauss coil is engaged with a degauss coil holding portion.

DETAILED DESCRIPTION OF THE PREFERRED EMBODIMENT

Figure 1:
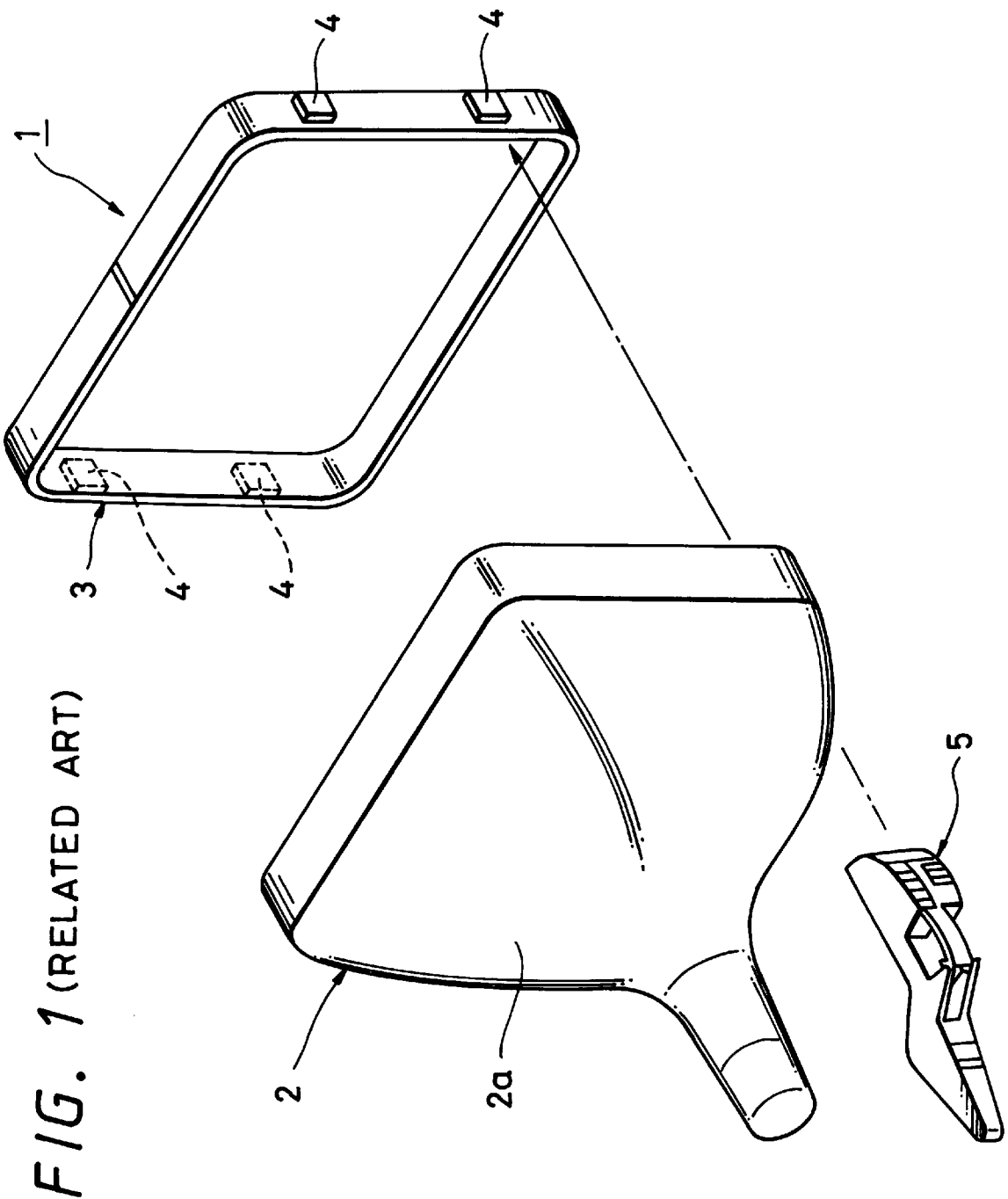
FIG. 1 is a perspective view illustrating the manner in which a degauss coil holder is attached to a cathode-ray tube like other assemblies.
Figure 2:
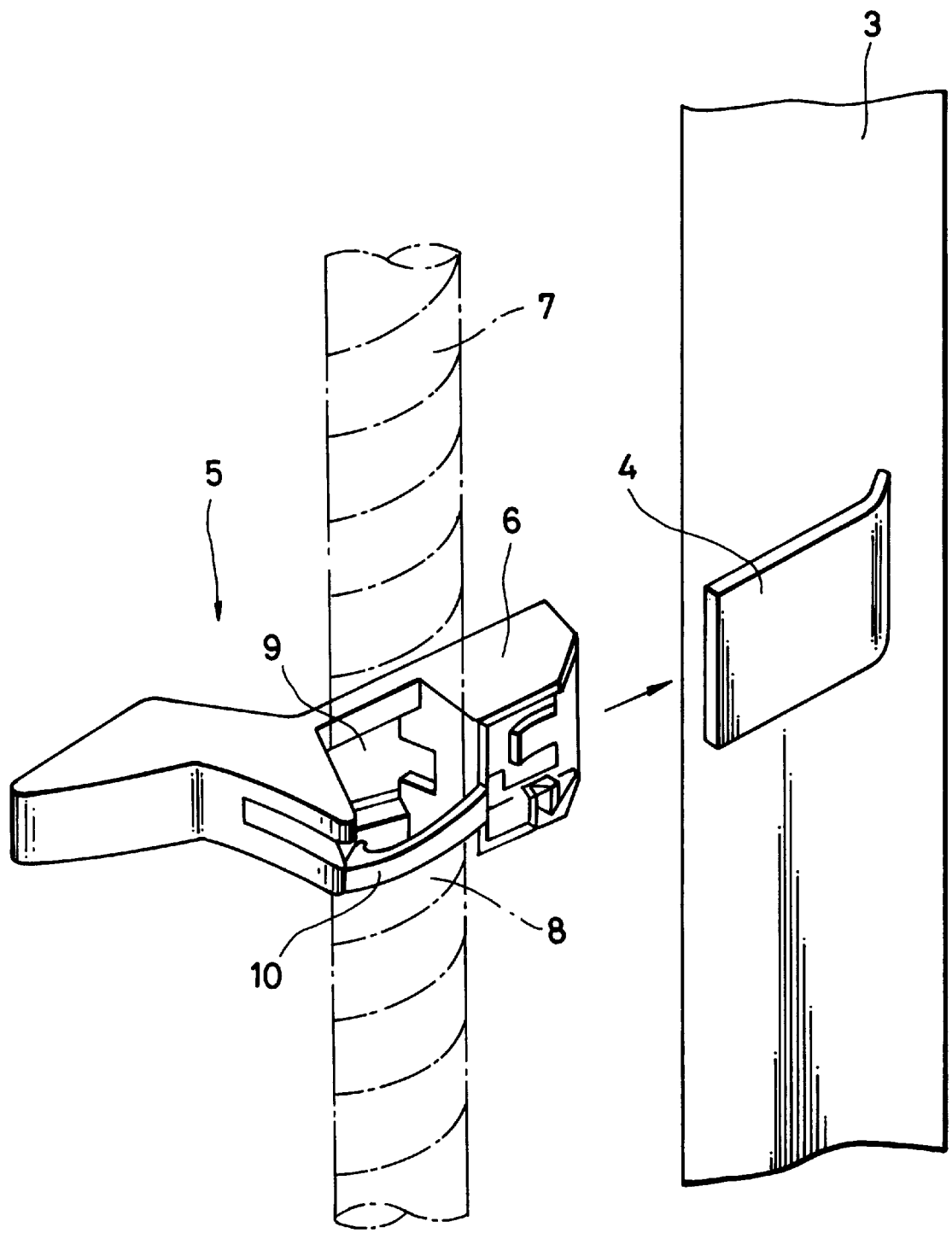
FIG. 2 is a fragmentary perspective view illustrating a degauss coil holding portion in an enlarged scale.

An apparatus for attaching a degauss coil to a cathode-ray tube according to the present invention will hereinafter be described with reference to FIGS. 3 to 5 and FIGS. 6A to 6C. In FIGS. 3 to 5 and FIGS. 6A to 6C, elements and parts identical to those of FIGS. 1 and 2 are marked with the same reference numerals in order to facilitate the understanding of the present invention.

Figure 3:
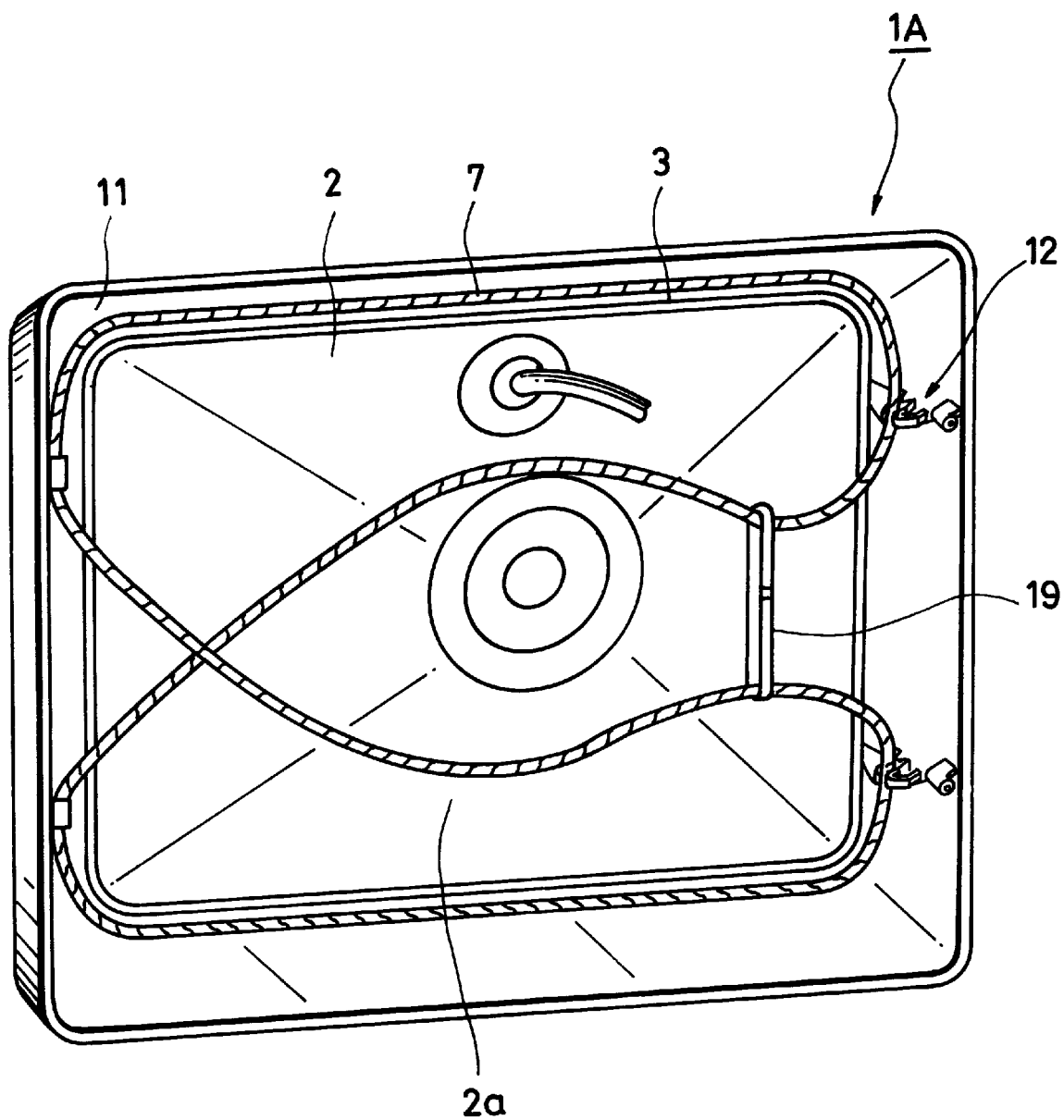
FIG. 3 is a schematic perspective view illustrating an apparatus for attaching a degauss coil to a cathode-ray tube according to the present invention.

As shown in FIG. 3, an apparatus 1A for attaching a degauss coil to a cathode-ray tube comprises degauss coil holding portions 12 unitarily formed as one body on the inner side wall surfaces of a front cabinet 11 and a degauss coil 7 engaged with the degauss coil holding portions 12 so as to be stretched over the funnel 2a of the cathode-ray tube 2. The degauss coil 7 is of a single annular wire composed of a bundle of wires forming a coil.

Figure 4:
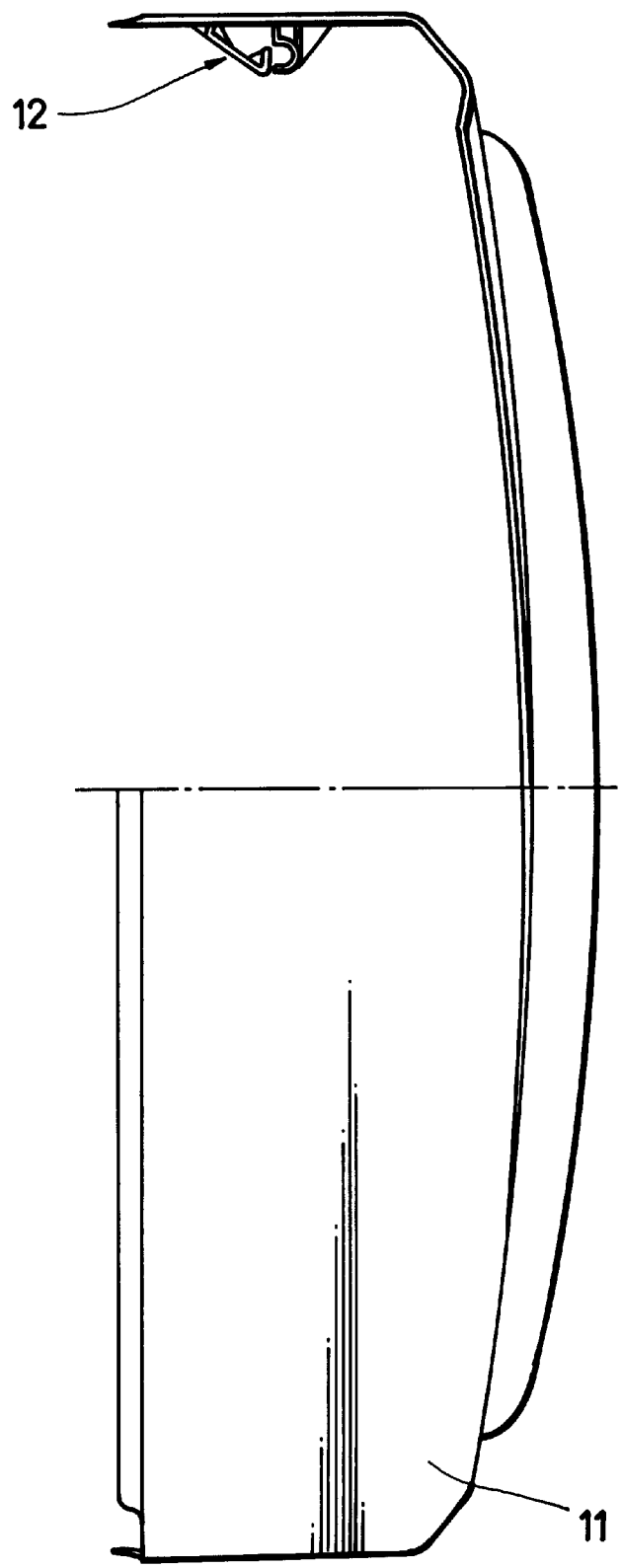
FIG. 4 is a plan view illustrating a holding portion which is unitarily formed as one body with a front cabinet.

As shown in FIGS. 3 and 4, the degauss coil holding portions 12 are unitarily formed as one body on the upper and lower locations on the inner side wall surfaces of both side surfaces of the front cabinet 11, i.e. four places in total on the inner side wall surfaces of the front cabinet 11.

Figure 5:
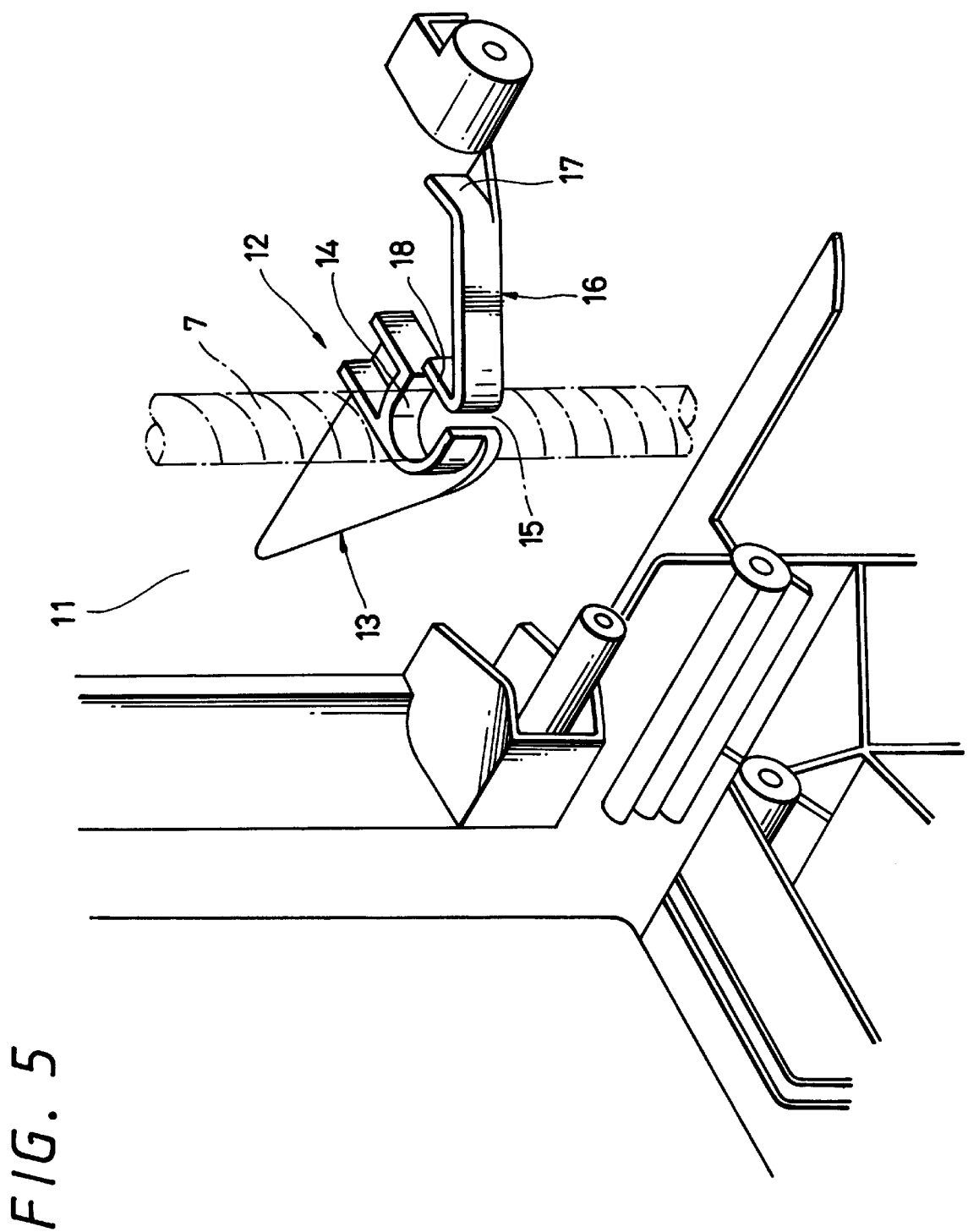
FIG. 5 is a fragmentary perspective view illustrating a degauss coil holding portion unitarily formed as one body with a side wall surface of a front cabinet.

As shown in FIG. 5, the degauss coil holding portion 12, which is unitarily formed as one body on the inner side wall surface of the front cabinet 11, comprises a holding body portion 13 of substantially a triangular configuration having a partly-opened circular space to hold the degauss coil 7 and a resilient portion 16 having a resilient force to oppose the open portion of the holding body portion 13.

The holding body portion 13 is provided on the left and right inner side wall surfaces of the front cabinet 11 and is unitarily formed as one body on the side wall surface in a triangular shape with respect to the lateral direction. The triangular top portion of the holding body portion 13 comprises a circular engagement portion 14 into which the degauss coil 7 is loosely fitted and an open portion 15 formed from a part of the engagement portion 14 and having a width greater than the diameter of the degauss coil 7.

The open portion 15 is opened in the direction of the rear surface of the front cabinet 11 so that the degauss coil 7 can be easily attached from the rear of the front cabinet 11.

The resilient portion 16 is substantially triangular in shape and spaced apart from the open portion 15 side of the holding body portion 13 by a predetermined distance. The resilient portion 16 comprises a base portion 17 of a plate member configuration joined to the front cabinet 11 and a stopper 18 of a substantially dog-legged configuration formed at its free end portion to oppose the open portion 15 at a predetermined distance from the open portion 15. The resilient portion 16 forms a resilient member such that the stopper 18 at the free end bends from the base portion 17 toward the inner side wall surface direction of the front cabinet 11.

A distance between the stopper 18 and the open portion 15 opposing the stopper 18 is selected in such a manner that the degauss coil 7 may not be disengaged from the engagement portion 14, i.e. a distance shorter than the diameter of the degauss coil 7.

To engage the degauss coil 7 is selected with the degauss coil holding portion 12, the degauss coil 7 is brought to the the stopper 18 side of the resilient portion 16 as shown in FIG. 6A.

Then, as shown in FIG. 6B, the degauss coil 7 is contacted with the outside of the stopper 18 of the resilient member 16 and urged against the outside of the stopper 18 so that the resilient portion 16 is resiliently compressed. Under the condition that the resilient portion 16 is resiliently compressed, the degauss coil 7 is further pressed so as to further compressed the resilient portion 16 until the distance between the open portion 15 and the stopper 18 is such that the degauss coil 7 can be inserted.

Then, as shown in FIG. 6C, when the resilient portion 16 is compressed so that the distance between the open portion 15 and the stopper 18 is such that the degauss coil 7 can be inserted, the degauss coil 7 is housed in the engagement portion 14 and disengaged from the resilient portion 16 with the result that the compressed resilient portion 16 is recovered its original state by a resilience. As a consequence, inasmuch as the distance between the stopper 18 and the open portion 15 is smaller than the diameter of the degauss coil 7, even when a force for disengaging the degauss coil 7 from the engagement portion 14 acts on the degauss coil 7, the stopper 18 can prevent the degauss coil 7 from being disengaged from the engagement portion 14. Further, the resilient portion 16 cannot generate a resilience against a pressing force from the inside of the stopper 18 so that the resilient portion 16 is not compressed and can function to prevent the degauss coil 7 from being disengaged from the engagement portion 14.

As shown in FIG. 3, since the annular-shaped degauss coil 7 attached to the degauss coil holding portion 12 is stretched over the curved surface of the funnel 2a through the upper and lower portions of the cathode-ray tube 2, is engaged with the degauss coil holding portions 12 unitarily formed as one body on the upper and lower locations of the inner side wall surfaces of both the left and right sides of the front cabinet 11 and is attached to the funnel 2a of the cathode-ray tube 2 with a tension by a tension band 19, the degauss coil 7 can be easily and tightly attached to the cathode-ray tube 2 at its funnel 2a protruded rearward from the front cabinet 11.

As described above, according to the apparatus for attaching a degauss coil to a cathode-ray tube, since the holders for holding the degauss coil are unitarily formed as one body with the front cabinet, the number of assemblies for holding the degauss coil can be reduced, the manufacturing process can be simplified and a working process for tightly attaching the degauss coil to the curved funnel surface of the cathode-ray tube can be improved in efficiency.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. An apparatus for attaching a degauss coil to a cathode-ray tube comprising:
   a plastic front cabinet for holding a cathode-ray tube;
   an annular degauss coil disposed on a funnel surface of said cathode-ray tube for degaussing said cathode-ray tube; and a plastic degauss coil holding portion for holding said degauss coil and being unitarily formed as one body with said front cabinet, said degauss coil holding portion having an engagement portion for receiving therein said degauss coil and a resilient portion having a stopper at an end thereof, whereby said resilient portion is deflected from a first position to a second position to move said stopper beyond said engagement portion so that said degauss coil is received in said engagement portion and when said resilient portion returns to said first position said degauss coil is retained in said engagement portion by said stopper.

2. The apparatus for attaching a degauss coil to a cathode-ray tube as claimed in claim 1, wherein said degauss coil holding portion is formed at an upper and a lower location on both left and right inner surfaces of said front cabinet.

3. The apparatus for attaching a degauss coil to a cathode-ray tube as claimed in claim 2, wherein said engagement portion has an open portion opened in a rear direction of said front cabinet.

* * * * *